United States Patent [19]

Burlone

[11] 4,374,641

[45] Feb. 22, 1983

[54] POLYMERIC COLOR CONCENTRATES FOR THERMOPLASTIC POLYMERIC MATERIALS

[75] Inventor: Dominick A. Burlone, Anderson, S.C.

[73] Assignee: Badische Corporation, Williamsburg, Va.

[21] Appl. No.: 156,716

[22] Filed: Jun. 5, 1980

Related U.S. Application Data

[63] Continuation of Ser. No. 62,841, Aug. 1, 1979, abandoned.

[51] Int. Cl.³ ............................................. D06P 3/00
[52] U.S. Cl. ......................................... 8/557; 8/539; 523/351; 524/601; 524/606; 524/612
[58] Field of Search ................ 8/552, 647, 539, 557; 260/37 NP, 37 P, 37 AL; 523/351; 524/601, 606, 612

[56] References Cited

U.S. PATENT DOCUMENTS

| | | | |
|---|---|---|---|
| 2,809,954 | 10/1957 | Kazenas | 252/301.35 X |
| 2,938,873 | 5/1960 | Kazenas | 252/301.35 |
| 3,116,256 | 12/1963 | D'Alelio et al. | 252/301.35 |
| 3,216,948 | 11/1965 | Redding | 260/37 R |
| 3,360,497 | 12/1967 | Jones et al. | 260/42.55 |
| 3,412,034 | 11/1968 | McIntosh et al. | 260/29.1 R |
| 3,412,035 | 11/1968 | McIntosh et al. | 252/301.35 |
| 3,734,872 | 5/1973 | Wakimoto et al. | 260/22 CB |

FOREIGN PATENT DOCUMENTS

| | | |
|---|---|---|
| 657081 | 9/1951 | United Kingdom . |
| 820207 | 9/1959 | United Kingdom . |
| 822709 | 10/1959 | United Kingdom . |
| 900752 | 7/1962 | United Kingdom . |
| 977586 | 12/1964 | United Kingdom . |
| 1009911 | 11/1965 | United Kingdom . |
| 1356006 | 6/1974 | United Kingdom . |

OTHER PUBLICATIONS

Venkaraman, K., "The Chemistry of Synthetic Dyes," vol. V, (Academic Press, 1971), pp. 323–324, 456.

*Primary Examiner*—A. Lionel Clingman
*Attorney, Agent, or Firm*—George F. Helfrich

[57] ABSTRACT

A color concentrate for coloring thermoplastic polymeric materials, which is prepared from a blend of a water - or organic solvent-dispersible polymer and a heat-stable, chemically-inert coloring agent selected from water-soluble dyes, organic-soluble dyes, polymer-soluble dyes, and pigments, from which blend any solvent present during processing is subsequently removed.

7 Claims, No Drawings

4,374,641

POLYMERIC COLOR CONCENTRATES FOR THERMOPLASTIC POLYMERIC MATERIALS

CROSS-REFERENCE

This application is a continuation of application Ser. No. 62,841 of Aug. 1, 1979 now abandoned.

BACKGROUND OF THE INVENTION

1. Field of the Invention

This invention relates generally to the coloring of thermoplastics. In particular, it relates to the coloring of thermoplastics by the incorporation of color concentrates therein.

2. Prior Art

The coloring of thermoplastic articles by incorporation of pigments introduced as color concentrates is well known. Likewise, the coloring of synthetic thermoplastic fibers by absorption of dye from solution is also a common procedure. However, coloring of fibrous materials through the use of color concentrates is a less common practice. The reasons for this are many fold. It is imperative that the degree of dispersion of pigmentary particles in the concentrate be very high so that the spinning process will not be interrupted. On the other hand, preparation of masterbatches of dye concentrate, which would not have such a dispersion problem, by a chip dyeing procedure is complicated and expensive. Futhermore, the majority of color concentrates available today contain vehicles which are not totally compatible with, for instance, nylon, since nylon is one of the fibers which is less commonly colored by the addition of color concentrates.

Described here is the preparation of pigment or dye concentrates in vehicles which are compatible with common fiberforming thermoplastic materials, in particular nylon. The procedure is simple and very flexible. It can be used to prepare concentrates of pigments or water- or solvent-soluble dyes, starting from dry colorant powders or from presscakes or aqueous or solvent dispersions. The concentrates can be used to color thermoplastic materials using blending techniques or melt injection of concentrate into polymer streams. The degree of dispersion is very good, so the concentrates can be used to color fibrous as well as more dimensionally uniform objects.

Advantages of the instant system over those described in the prior art are a result of the advantages of employing a polymer which is soluble in water and/or in organic solvents:

A. Water

Pigments and dyes are precipitated from aqueous reaction mixtures during manufacture. Pigments are very finely divided at this point. Subsequent drying agglomerates pigment, and this is undesirable. Having a polymer which is water soluble allows for easy incorporation of pigment into polymer by mixing polymer solution and pigment dispersion and drying. Water soluble dyes can also be incorporated with no dispersion problem whatsoever and with very high color yields.

B. Organic Solvent

There are classes of dyes which are very soluble in certain organic solvents. Having a polymer soluble in these polar organic solvents enables one to make high concentration concentrates with no dispersion problem and with very high color yields.

Statement of Closest Known Art

1. U.S. Pat. No. 1,119,960. The essence of this process is a transfer of pigment from aqueous to "oil" phase. This is a three phase process—solid, aqueous and oil. The oil and the aqueous phase remain as two distinct liquids. The present process is two phase—solid and one liquid. No surfactants are used. There is no concern about incomplete transfer of pigment, so no pigment is lost. There is no concern about partial miscibility of oil in water thus resulting in loss of some of the oil phase and contamination of the water. All of the instant polymer is recovered, and any water present is removed by drying.

Another advantage of the present system is that a thermoplastic color concentrate can be made with ease from a process performed completely at room temperature. If the process of the reference is done at room temperature, it is necessary that the oil phase be a liquid, and thus the resulting colored product is not suited for handling using conventional plastic extrusion equipment. If the oil phase is a thermoplastic, then the process must be carried out at elevated temperatures. This is undesirable and also presents problems of miscibility of the different phases, because of viscosity differences and too rapid drying of the aqueous phase.

Moreover, since the instant polymers are soluble in aqueous and polar organic solvents, one can incorporate dyes, both water soluble and solvent soluble, into such polymers at room temperature without going through a phase transfer process.

The degree of dispersion achieved in a solid concentrate in the process of the reference is usually limited to the degree of dispersion originally present in the presscake. In the present invention, it is a simple matter to disperse the colorant, either in pure solvent or in the polymer solution or dispersion, to any desired degree of dispersion.

2. U.S. Pat. No. 3,360,497. This reference uses a phase transfer process. However, since the final phase thereof is hydrophobic and is not soluble in water, a preliminary phase transfer step is required in order to transfer pigment from aqueous to hydrophobic phase. Complicated surfactants are needed. This hydrophobic dispersion is then combined with a solution of polymer in a hydrophobic solvent. In an embodiment of the present system, polymer is added directly to the aqueous dispersion. This simplifies matters greatly. No preliminary phase transfer step is necessary and no phase transfer surfactants are needed. The problems of incomplete transfer and other problems associated with phase transfer as mentioned above are eliminated. The referenced system would have utility with solvent soluble dyes, but transfer of colorant from aqueous phase to "oil" phase is still required; whereas the present system is a single liquid phase system.

SUMMARY OF THE PRESENT INVENTION

Difficulties resulting from the utilization of prior art processes and compositions are obviated by the provision of a color concentrate according to the present invention. This color concentrate is a blend of two essential components, advantageously a fluid-phase blend, from which blend any solvent present during processing is subsequently removed. The first component is a water-dispersible or organic solvent-dispersible polymer which is capable of being:

(1) utilized in the preparation of a 1–95% solution or dispersion;

(2) recovered from a 1–95% solution or dispersion thereof at a temperature which will not cause substantial volatilization or degradation thereof;

(3) fused at standard thermoplastic processing temperatures; that is, between about 130° and 350° C.;

(4) melted with a thermoplastic material to be colored without substantial degradation or reaction and without any visible separation on a microscopic scale; and (5) utilized as a wetting agent for pigments.

The second component is a heat-stable, chemically inert coloring agent selected from the group consisting of water-soluble dyes, organic-soluble dyes, polymer-soluble dyes, and pigments.

Especially advantageous results are achieved if the first component of the concentrate is selected from the group consisting of water-dispersible or organic solvent-dispersible polyamides; water-dispersible or organic solvent-dispersible polyesters; water-dispersible or organic solvent-dispersible vinyl polymers or copolymers; and water-dispersible or organic solvent-dispersible alkylene oxide polymers or copolymers. Under such conditions, very beneficial results are obtained when the coloring agent is a pigment, which is present in the color concentrate in an amount sufficient to provide from about 1 to about 70 percent by weight thereof, based on the total weight of the color concentrate. Equally beneficial results are achieved, moreover, if the coloring agent is a dye, which is present in the color concentrate in an amount sufficient to provide from about 1 to about 70 percent by weight thereof, based on the total weight of the color concentrate.

Concentrates according to the present invention are utilized with especially advantageous results in coloring thermoplastic polymeric materials which are employed in the production of synthetic textile fibers.

DETAILED DESCRIPTION OF THE PREFERRED EMBODIMENTS

EXAMPLES

The following examples set forth in detail various methods of preparing and utilizing color concentrates according to the present invention. As is understood by those of skill in the art, these examples are illustrative in nature, and should not be taken as limiting the invention in any way.

EXAMPLE 1

176 g of the water dispersible polyamide of U.S. Pat. No. 3,846,507 was combined with 704 g of water. The mixture was stirred at 80° C. until dispersion of the polymer was complete.

200 g of Hilton Davis Peacoline (copper phthalocyanine) Blue 37.7% solids presscake was placed in a two quart stainless steel Waring blender. 80 g of the aqueous polymer dispersion was added to the blender. The mixture was blended for 25 minutes. The remaining 800 g of polymer dispersion was added in 200 g increments with approximately 10 minutes blending time between increments. Microscopic examination of the pigment slurry at this point revealed very good wetting of the pigment by the vehicle and dispersion of the pigment in the vehicle.

The slurry was then filtered through a 35 mm screen pack assembly consisting of 4 filter screens: a 20 mesh, a 60 mesh, a 180 mesh, and a 325 mesh (40 micron) screen. One filter change was required. The slurry was then collected in a shallow pan and dried under vacuum at 60° C. until hard (approximately 2 days). This yielded a color concentrate containing 30% pigment.

One part of the solid color concentrate was blended with 29 parts of uncolored nylon-6 polymer containing 0.03% titanium dioxide. This mixture was extruded into yarn comprised of fiber of 52 denier/filament at a temperature of 255° C. and a spinning speed of 330 meter/minute. This fiber was then drawtwisted at a draw ratio 3.4 to 1 at a speed of 400 meters/minute with twist of 0.25 turns/inch to yield yarn containing drawn fiber of approximately 16 denier/filament. Deeply colored blue fiber containing 1% pigment was obtained.

EXAMPLE 2

The procedure of Example 1 was repeated except that the Hilton Davis Peacoline Blue 37.7% solids presscake was replaced by duPont Monastral Green G 53.4% high-solids presscake. Deeply colored green fiber containing 1% copper phthalocyanine green pigment was obtained.

EXAMPLE 3

The procedure of Example 1 was repeated except that the Hilton Davis Peacoline Blue presscake was replaced by BASF Paliofast LBDG-K 46.6% solids copper phthalocyanine blue presscake. Deeply colored blue fiber containing 1% pigment was obtained.

EXAMPLE 4

The procedure of Example 1 was repeated except that Hilton Davis Peacoline Blue presscake was replaced by duPont Monastral Green G GT-751-D dry powder copper phthalocyanine pigment and dispersion was accomplished ultrasonically using an ultrasonic dispersing device manufactured by Sonic Corp. (Stratford, CT.) to produce a concentrate containing 25% pigment. The concentrate was used as before to produce deeply colored green fiber.

EXAMPLE 5

The procedure of Example 1 was repeated except that Hilton Davis Peacoline Blue presscake was replaced by BASF Luconyl Red 387, a 30 percent dispersion of Pigment Red 123 in water, and no high speed mixing was employed. One part of the 30 percent concentrate was blended with 29 parts of uncolored nylon 6 polymer containing 0 percent titanium dioxide, and the procedure of Example 1 was followed to produce deeply-colored red fiber containing 1% pigment.

EXAMPLE 6

320 g of BASF Neozapon Yellow R solvent-soluble dye was dispersed in 1067 ml of anhydrous methanol. The colorant dispersed (except for a small amount of residual insolubles) almost instantly and very little stirring was required.

480 g of the polyamide of U.S. Pat. No. 3,846,507 was combined with 2400 g of a solvent which consisted of 300 g of water and 2100 g of methanol. The mixture was stirred at 50° C. until dispersion of the polymer was complete.

The 17% polymer dispersion was added slowly to the methanolic dispersion of Neozapon R with stirring. The resulting dispersion was then filtered through the filter pack assembly described in Example 1. Almost no pressure build-up on the screen pack was recorded. The dispersion was then placed in a shallow pan and dried under vacuum at 50°-60° C. 670 g of a 40% color concentrate was obtained.

One part of the solid color concentrate was blended with 39 parts of uncolored nylon-6 polymer containing 0.03% titanium dioxide. The mixture was extruded into fiber as in Example 1 to obtain deeply colored golden fiber containing 1% colorant.

EXAMPLE 7

6.5 g of the nylon soluble colorant Filamid Red 841 (Ciba Geigy) was combined with 100 g of a 20% aqueous dispersion of the polyamide of U.S. Pat. No. 3,846,507. The mixture was heated to 50° C. and agitated overnight. The mixture was then removed from the heat and left undisturbed until the colorant completely dispersed. The dispersion was filtered through the filter pack assembly described in Example 1. It was estimated that <3% of the original amount of colorant was deposited on the screen. The dispersion was dried in a vacuum oven at approximately 60° C. to obtain a color concentrate containing 25% pigment.

One part of the solid color concentrate was blended with 24 parts of uncolored nylon-6 polymer containing 0.03% titanium dioxide. The mixture was extruded into yarn comprised of fiber of 52 denier/filament at a temperature of 255° C. and a spinning speed of 330 meters/minute. The yarn was then drawtwisted to yield deeply colored maroon fiber of 12 denier/filament.

EXAMPLE 8

The procedure of Example 7 was repeated except that Filamid Red 841 was replaced by Filamid Yellow 2732. Deeply colored golden fiber was obtained.

EXAMPLE 9

The procedure of Example 1 was repeated except that American Hoechst pigment Novoperm Red BL was used, and the pigment was compounded directly into the molten polyamide of U.S. Pat. No. 3,846,507 using a high shear process rather than dispersed into an aqueous dispersion of the polymer using a high speed mixing process. A color concentrate containing 25% pigment was obtained. One part of this solid color concentrate was blended with 24 parts of uncolored nylon-6 polymer containing 0.03% titanium dioxide and spun and drawtwisted into yarn as described in Example 1. Deeply colored red fiber containing 1% pigment was obtained.

EXAMPLE 10

One part of the color concentrate of Example 2 was blended with 29 parts of uncolored poly(ethylene terephthalate) containing 0.33% titanium dioxide and spun into yarn comprised of fiber of 52 denier/filament at a temperature of 300° C. and a spinning speed of 330 meters/minute. The yarn was drawtwisted as in Example 1 to yield deeply colored green fiber of 16 denier/filament, containing 1% pigment.

EXAMPLE 11

463 g of Hilton Davis Peacoline (copper phthalocyanine) Blue 37.7% solids presscake was placed in a two quart stainless steel Waring blender. 715 g of a 28.5% dispersion of the water-dispersible polyester of U.S. Pat. No. 4,098,741 was added to the blender and the mixture was blended for one hour. An additional 715 g of the polyester dispersion was added to the mixture and blending was continued for another hour. Microscopic examination of the pigment slurry at this point revealed good wetting of the pigment by the vehicle and good dispersion of the pigment in the vehicle.

The slurry was then filtered through the 35 mm screen pack described in Example 1. No filter changes were required. The slurry was collected in a shallow pan and dried under vacuum at 60° C. until hard. This yielded a color concentrate containing 30% pigment. One part of the solid color concentrate was blended with 29 parts uncolored nylon-6 polymer containing 0.03% titanium dioxide. The mixture was extruded into yarn comprised of fiber of 52 denier/filament at a temperature of 255° C. and a spinning speed of 330 meters/minute. This yarn was then drawtwisted into fiber of 12 denier/filament to yield deeply colored blue fiber containing 1% pigment.

EXAMPLE 12

One part of the color concentrate of Example 11 was blended with 29 parts of uncolored poly(ethylene terephthalate) containing 0.33% titanium dioxide and spun into yarn comprised of fiber of 52 denier/filament at a temperature of 300° C. and a spinning speed of 330 meters/minute. The yarn was drawtwisted to yield fiber of 16 denier/filament. Deeply colored blue fiber containing 1% pigment was obtained.

EXAMPLE 13

One part of the color concentrate of Example 11 as blended with 29 parts of the uncolored poly(ethylene terephthalate) containing no titanium dioxide and spun into yarn comprised of fiber of 52 denier/filament at a temperature of 300° C. and a spinning speed of 330 meters/minute.

The yarn was drawtwisted to yield fiber of 12 denier/filament. Deeply colored blue fiber containing 1% pigment was obtained.

EXAMPLE 14

142 g of duPont Monastral Green G GT-751-D dry powder copper phthalocyanine pigment was placed in a two quart stainless steel Waring blender. 750 g of a 28.5% dispersion of the water dispersible polyester of U.S. Pat. No. 4,098,741 was added to the blender and the mixture was blended for 1 hour. An additional 750 g of polymer dispersion was added and blending was continued for an additional hour. Microscopic examination of the pigment slurry revealed good wetting of the pigment by the vehicle and good dispersion of the pigment in the vehicle. The slurry was filtered through the screen pack assembly described in Example 1. One filter change was made during the filtering. The slurry was collected in a shallow pan and dried in a vacuum oven at 50° C. until hard. A color concentrate containing 25% pigment was obtained.

One part of the solid color concentrate was blended with 24 parts of uncolored poly(ethylene terephthalate) containing 0.33% titanium dioxide and spun into yarn comprised of fiber of 52 denier/filament at a temperature of 300° C. and at a spinning speed of 330 meters/minute. The yarn was drawtwisted as in Example 1 to yield a fiber of 16 denier/filament. Deeply colored green fiber containing 1% pigment was obtained.

EXAMPLE 15

400 g of the sodium salt of a low molecular weight vinyl copolymer consisting of the monomers 2-sulfoethyl methacrylate and ethyl acrylate in a ratio of 1 sulfonated monomer to every 4 to non-sulfonated monomers was combined with 400 g of water. The polymer dissolved rapidly to yield a clear yellow liquid which appeared to be more of a true polymer solution than a dispersion as was obtained in the previous examples.

454.7 g of Hilton Davis Peacoline (copper phthalocyanine) Blue 37.7% solids presscake was placed in a two quart stainless steel Waring blender. 400 g of the polymer solution was added to the blender and the mixture was blended for 45 minutes. The remaining polymer solution was added and the mixture was blended for an additional 45 minutes.

The pigment slurry was then filtered through the screen pack assembly described in Example 1 with one filter change required. The material was collected in a stainless steel beaker and dried under vacuum at 40°–70° C. until hard. A color concentrate containing 30% pigment was obtained.

One part of the solid color concentrate was blended with 29 parts of uncolored nylon-6 polymer containing 0.03% titanium dioxide. This mixture was extruded into yarn comprised of fiber of 52 denier/filament at a temperature of 255° C. and a spinning speed of 330 meters/minute.

A sulfur-like odor was noticed during spinning and extrusion of uncolored vinyl polymer with nylon-6 causing a slight discoloration of the nylon. Also, some crocking of the blue colorant onto guides on the fiber takeup machine was noticed. The spun yarn was drawtwisted as described in Example 1 to yield fiber of 16 denier/filament. Deeply colored blue fiber containing 1% pigment was obtained.

EXAMPLE 16

400 g of a primarily poly (alkylene oxide) polymer such as those disclosed in U.S. Pat. No. 4,093,676 or U.S. Pat. No. 4,029,694, was combined with 2266 g of water and the mixture was heated and stirred until the polymer became dispersed homogeneously in the water solvent. The mixture was blended in a Waring blender briefly to insure homogeneity.

606 g of Hilton Davis Peacoline (copper phthalocyanine) Blue 37.7% solids presscake was placed in a two quart stainless steel Waring blender. 500 g of the polymer dispersion was added to the blender and the mixture was blended for 1 hour. The remaining 2166 g of polymer dispersion were added to the pigment slurry in four equal increments and the mixture was blended for 30 minutes after each addition. Microscopic examination of the pigment slurry revealed good wetting of the pigment by the vehicle and good dispersion of the pigment in the vehicle.

The pigment slurry was filtered through the filter pack assembly described in Example 1. Three filter changes were required. The slurry was collected in a shallow pan and dried under vacuum at 50°–60° C. until dry. A color concentrate containing 36% pigment was obtained.

One part of the solid color concentrate was blended with 35 parts of uncolored nylon-6 polymer containing 0.03% titanium dioxide. The mixture was extruded into yarn comprised of fiber of 52 denier/filament at a temperature of 255° C. and a spinning speed of 330 meters/minute. This yarn was then drawtwisted as in Example 1 to yield deeply colored blue fiber of 16 denier/filament.

EXAMPLE 17

40.2 g of duPont Monastral Green G GT-751-D dry powder copper phthalocyanine pigment, 6.0 g of the surfactant:

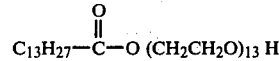

and 160.0 g of demineralized water were charged into a two quart stainless steel Waring blender. The mixture was blended for 30 minutes and then filtered through the filter assembly described in Example 1.

75 g of nylon-6 polymer containing no titanium dioxide was dissolved in 300 g of formic acid at a temperature near the boiling point of formic acid.

The pigment slurry was heated to 90° C. and added slowly to the hot polymer solution. The resulting slurry was collected in a shallow pan and allowed to sit undisturbed for 2 days. Upon cooling, a solid material was obtained. This solid material was broken into smaller pieces and placed in a vacuum oven at 60° C. until dry. A color concentrate containing 22% pigment was obtained.

One part of the solid color concentrate was blended with 21 parts of uncolored nylon-6 polymer containing 0.03% titanium dioxide. The mixture was extruded into yarn comprised of fiber of 52 denier/filament at a temperature of 255° C. and a spinning speed of 330 meters/minute. This yarn was then drawtwisted as in Example 1 to yield deeply colored green fiber of 16 denier/filament.

EXAMPLE 18

194 g of the water dispersible polyamide of U.S. Pat. No. 3,846,507 was combined with 775 g of water. The mixture was stirred at 80° C. until dispersion of the polymer was complete.

83 g of Ciba-Geigy Nylaspin Scarlet G heat stable, water soluble dye was added to the aqueous polymer dispersion. As the mixture was stirred, the dye particles dissolved and went into solution forming a deep maroon-colored liquid. The viscosity of the polymer dispersion increased as the dye particles dissolved. Heating to 40° C. accelerated the dissolution process.

Microscopic examination of the dye solution revealed a deeply and uniformly colored liquid containing a small number of insoluble particles, the particles being present in the original dye powder.

The solution/dispersion was filtered through the filter pack assembly described in Example 1 and dried in a vacuum oven at 60° C. to obtain a thermoplastic color concentrate containing 30% colorant.

One part of the solid color concentrate was blended with 29 parts of uncolored nylon-6 polymer containing 0.03% titanium dioxide. The mixture was extruded into yarn comprised of fiber of 52 denier/filament at a temperature of 255° C. and a spinning speed of 330 meters/minute. This yarn was then drawtwisted as in Example 1 to yield drawn fiber of approximately 16 denier/filament.

Deeply colored brownish-orange fiber containing 1% colorant was obtained.

The present invention has been described in detail with respect to certain preferred embodiments thereof. As is understood by those of skill in the art, variations and modifications in this detail may be effected without any departure from the spirit and scope of the present invention, as defined in the hereto-appended claims.

I claim:

1. A color concentrate for coloring thermoplastic polymeric materials, the concentrate comprising a blend of the following two essential components, from which blend any solvent present during processing is subsequently removed:

(A) A water- or polar organic solvent-dispersible polycondensation or addition polymer polymerized from condensable or unsaturated monomers containing functional groups capable of solubilizing or dispersing the polymer in water or in polar organic solvents, and which is capable of being:

(1) utilized in the preparation of 1–95% solution or dispersion;

(2) recovered from a 1–95% solution or dispersion thereof at a temperature which will not cause substantial volatilization or degradation thereof;

(3) fused at a temperature between about 130° and 350° C.;

(4) melted with the thermoplastic polymeric material to be colored without substantial degradation or reaction and without any visible separation therefrom on a microscopic scale; and (5) utilized to wet the surface of pigments by adhesion thereto; and (B) A heat-stable, chemically-inert coloring agent selected from the group consisting of: water-soluble dyes; polar organic solvent-soluble dyes; polymer-soluble dyes; and pigments, the coloring agent causing no visible chemical reaction with the thermoplastic polymeric material to be colored or the water- or polar organic solvent-dispersible polycondensation or addition polymer.

2. The color concentrate of claim 1, wherein component A is selected from the group consisting of: water- or polar organic solvent-dispersible polyamides; water- or polar organic solvent-dispersible polyesters; water- or polar organic solvent-dispersible vinyl polymers or copolymers; and water- or polar organic solvent-dispersible alkylene oxide polymers or copolymers.

3. The color concentrate of claim 2, wherein the coloring agent is a pigment, which is present in the color concentrate in an amount sufficient to provide from about 1 to about 70 percent by weight thereof, based on the total weight of the color concentrate.

4. The color concentrate of claim 2, wherein the coloring agent is a dye, which is present in the color concentrate in an amount sufficient to provide from about 1 to about 70 percent by weight thereof, based on the total weight of the color concentrate.

5. The color concentrate of claim 2, wherein the functional groups capable of solubilizing or dispersing component A in water or in polar organic solvents are selected from the group consisting of sulfonate groups, phosphate groups, and polyglycol groups.

6. The color concentrate of claim 1, wherein the thermoplastic polymeric material to be colored is nylon-6.

7. The color concentrate of claim 1, wherein the thermoplastic polymeric material to be colored is poly (ethylene terephthalate).

* * * * *